United States Patent [19]

Farone et al.

[11] Patent Number: 4,868,365
[45] Date of Patent: Sep. 19, 1989

[54] METHOD FOR WELDING TORQUE CONVERTER BLADES TO A HOUSING USING A LASER WELDING BEAM

[75] Inventors: Joseph D. Farone, Novi; Richard W. Locker, Livonia, both of Mich.

[73] Assignee: Ford Motor Company, Dearborn, Mich.

[21] Appl. No.: 202,622

[22] Filed: Jun. 6, 1988

[51] Int. Cl.⁴ .............................................. B23K 26/00
[52] U.S. Cl. .......................... 219/121.64; 29/156.8 B; 219/121.14; 416/213 A
[58] Field of Search ...................... 219/121.63, 121.64, 219/121.13, 121.14; 29/156.8 B; 416/180, 213 A, 213 R; 74/695, 863, 952 C; 192/85 AA

[56] References Cited

U.S. PATENT DOCUMENTS

| | | | |
|---|---|---|---|
| 2,692,562 | 10/1954 | Zeidler | 416/180 |
| 3,316,622 | 5/1967 | Jandasek | 29/156.8 |
| 3,873,237 | 3/1975 | Tokunaga | 416/180 |
| 3,891,350 | 6/1975 | Adachi et al. | 416/180 |
| 3,932,061 | 1/1976 | Scott | 416/213 R X |
| 4,201,516 | 5/1980 | Kolk et al. | 416/213 R |
| 4,240,532 | 12/1980 | Blomquist | 192/106.2 X |
| 4,288,677 | 9/1981 | Sakata et al. | 219/121 ED |
| 4,598,449 | 7/1986 | Monhardt et al. | 219/121.14 X |

Primary Examiner—C. L. Albritton
Attorney, Agent, or Firm—Frank G. McKenzie; Donald J. Harrington

[57] ABSTRACT

A method for welding torque converter blades to an impeller housing by laser beam welding includes forming the blades with a tab fitted within a recess formed in the impeller housing such that the blade tab stands clear of the adjacent surfaces of the housing by the width of an air gap. A laser beam is directed onto an adjacent surface of the housing a short distance from an edge of the housing adjacent a blade tab to be welded to the housing. A laser beam, whose axis is inclined with respect to the recess, strikes a surface of the housing adjacent the tab. The welding gun is energized with electrical power and the welding beam is moved parallel to the blade tab at a predetermined speed consistent with the power. The blade tab is welded to the housing without the use of filler material and the housing is rotated with respect to its longitudinal axis to bring successive blade tabs into position for welding.

13 Claims, 2 Drawing Sheets

METHOD FOR WELDING TORQUE CONVERTER BLADES TO A HOUSING USING A LASER WELDING BEAM

BACKGROUND OF THE INVENTION

1. Field of the Invention

This invention relates to metal welding using focused energy beams such as laser beams and electron beams. More particularly, it pertains to welding thin sheet metal blades of a fluid coupling or torque converter to a housing spaced from the blade before welding to allow assembly.

2. Description of the Prior Art

Our invention relates generally to a hydrokinetic torque transmitting mechanism and more particularly to improvements in the construction and assembly of components of a bladed hydrokinetic member such as the impeller of a torque converter or fluid coupling.

In a torque converter, the impeller housing defines the outer boundary for the toroidal fluid flow circuit and it also retains the impeller blades and supports them rotatably. Conventionally, blades for a hydrokinetic torque transmitting device are attached to the turbine shell and impeller housing by inserting blade tabs within the toroidal circuit of the unit by bending projections or tabs on the blades through recesses formed in a shroud. This method is described in U.S. Pat. No. 3,316,622. Brazing is another conventional technique for connecting the blades to the turbine shell and impeller housing. The connection is made conventionally also by staking the blades to the housing, whereby the blades are inserted into recesses into the housing and the metal of the housing is cold worked and forced against the blade to form a rigid connection.

SUMMARY OF THE INVENTION

Electric arc welding of impeller blades inherently produces a large volume of metallic debris called "spatter" comprising parent and filler material. Particles of the parts being welded become separated from the body due to the intense, concentrated energy of a high voltage electric arc that makes the weld. This spatter material accumulates in the vicinity of the welding environment, becomes lodged inside the impeller housing, and is retained in corners of the housing assembly, especially those corners formed by planes intersecting at small acute angles. Once located there, spatter material becomes difficult to dislodge and virtually impossible to remove completely. Spatter is in the form of irregular particles and spherical beads of steel one-tenth inch in diameter or more.

In operation, the torque converter is filled with hydraulic fluid under pressure. In this environment, spatter material or other contaminating matter is flushed from its corners and becomes entrained in the toroidal fluid mainstream circulating within the torque converter at high speed. This material continually strikes the surfaces of the blades, cover and impeller housing, and can cause damage due to the force of its impact. Furthermore, the impact produces noise. Some of the material is removed from the mainstream by being caught in a screen located near the transmission sump or an inlet to the hydraulic pump that circulates the fluid through the transmission. Otherwise, it is recirculated. The potential for damage from this source is a problem of long standing duration and the object of continued attempts to find a solution.

Automatic transmission torque converter is directly connected to the engine shaft and must rotate at approximately 6000 rpm. The formed shape of the impeller housing is partially toroidal, but it deflects due to centrifugal effects and tends to assume a generally spherical shape at high speed. This deformation is particularly large near the radially inner region of the housing where the wall changes radial slope abruptly, a zone through which large centrifugal forces of the outer extremities of the housing are carried structurally to a point of support on the impeller hub.

The blades of the impeller are fixed to the housing and retained in position mechanically, by staking, inserting tabs or slots and bending the tabs, fitting tabs within recesses, or brazing. These techniques have been found unsatisfactory because the strength of the attachment of the blade to the housing is inadequate to conform to the structural deflections of the housing required by high speed operation in service. Conventional attachment methods permit separation of the blade from the housing, particularly at the radially innermost region of the blade where housing displacements are highest and centrifugal forces carried by the housing are greatest.

The method of the present invention provides an attachment for connecting impeller blades to the housing having strength far superior to conventional attachment techniques and able to improve rigidity, blade retention and deflection in the impeller housing.

The method of the present invention, however, avoids the difficulties inherent in conventional welding techniques requiring filler material to join components separated by a gap before welding and the spatter that accompanies conventional welding. Limited access to corners of the assembly where impeller blades contact the housing prevents the use of large welding guns required by electric arc welding. In the technique of the present invention, an electron beam or laser beam is directed by a welding gun from a distance sufficiently removed from the vicinity of the weld at such corners so that access to the weld region presents no difficulty. However, the accumulation of manufacturing and assembly tolerances required to assure that impeller blade tabs will fit within recesses formed on the inner surface of the housing results in gaps between the tabs and the walls of the recesses. Laser welding and electron beam welding have not been successful where such gaps exist because the welding beam is dispersed by passing through air in the gap. A gap in laser welding is known to cause deflection of the laser beam that prevents an accurate, repeatable, reliable weld. An electron beam welding requires the presence of a vacuum to avoid beam deflection.

These difficulties are overcome with the method of the present invention, yet the advantages discussed above are realized. In this method, each blade tab is located within a recess located on the inner surface of the impeller housing. The tabs are separated from the adjacent surfaces of the recess by gaps whose widths are set by requirements for dimensioning, manufacturing and assembly. The laser beam is directed angularly respect to the tab such that the focal point of the beam is located on the impeller and the beam does not pass through the air gap. The beam strikes a surface of the housing at a point a short distance from the edge of the recess adjacent the blade tab to be welded. The beam is controlled so that its trace on the surface of the housing produces a circle or an ellipse whose size is consistent with the magnitude of the electrical power supplied to the welding gun and the rate at which the beam is moved with respect to the parts to be welded. When electrical power is supplied to the welding gun, heat from the welding beam first melts the housing surface in the vicinity of the intersection of the beam with the housing, and progressively thereafter at greater depths from that surface. The molten housing metal produced by heat from the welder flows from the housing into the recess, fills the gaps between the housing and the blade tab, and produces a slight depression at the housing surface. As this molten metal flows into the recess, the beam continues to heat the housing and adjacent surfaces of the tab until these also are liquified and eventually fused to produce a high quality weld.

The welding beam is displaced linearly or rotated with respect to the blade tab so that it moves along the length of the tab until most of the length of the tab is welded to the housing in the vicinity of the recess. When the impeller housing is rotated about its longitudinal axis until successive blades are indexed to the position required for welding. Electrical welding power is applied again to the welding gun and the beam is moved along the length of the tab to complete the second blade tab weld. This process is repeated until the radially inner tab of each impeller blade is welded to the adjacent housing surface.

DESCRIPTION OF THE PREFERRED EMBODIMENT

Figure 1:
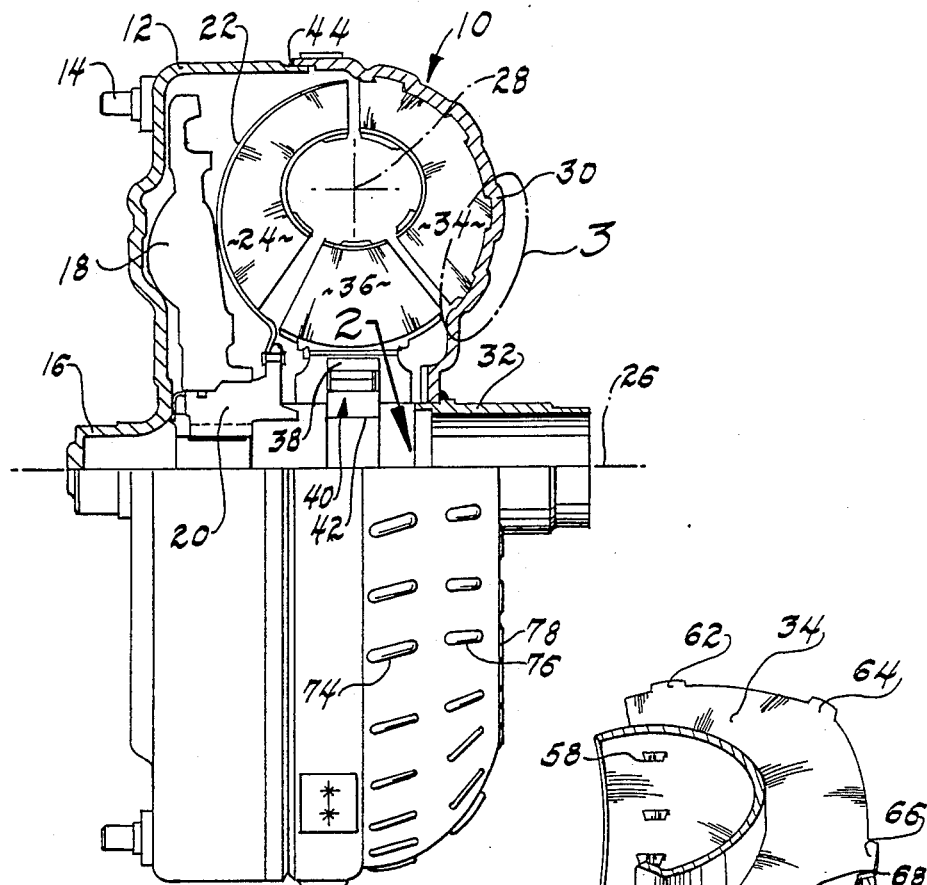
FIG. 1 is a side view, partially in cross section, of a hydrokinetic torque converter showing the relative position of the impeller, turbine and reactor blades, impeller housing and converter cover.

Referring first to FIG. 1, an automotive torque converter or fluid coupling 10 for an automatic transmission includes a cover 12 adapted for connection by a mechanical attachment to a flywheel (not shown) adapted to be driven by an engine crankshaft. The cover is supported on the surface 16 adapted to fit within a recess formed on the end of the engine shaft. A lockup clutch 18 is rotatably supported on the hub 20 of a turbine rotor 22, which includes multiple turbine blades 24, rotatably supported on the hub and distributed angularly about a longitudinal axis 26 extending along the length of the torque converter parallel to the engine shaft and perpendicular to a transverse axis 20. Following assembly, the torque converter is substantially symmetric about axis 26.

An impeller housing 30 is rotatably supported on the impeller hub and contains multiple impeller blades 34, spaced from one another angularly about axis 26. The impeller blades are disposed symmetrically about axis 26, spaced uniformly from one another, and fixed mechanically to the housing and shroud so that the blades and housing rotate as a unit about the longitudinal axis.

A reactor assembly includes multiple reactor blades 36 connected to the uter member 38 of a one-way clutch 40, whose inner member is adapted to be connected at a spline 42 to the outer surface of a transmission input shaft (not shown), whereby a one-way driving connection is made by clutch 40 to the input shaft.

The impeller housing and torque converter cover are overlapped and joined by a weld 44 that extends around the periphery of the housing and cover, thereby forming a seam that seals the space within the housing and cover assembly and prevents flow of hydraulic fluid past the weld.

Figure 3:
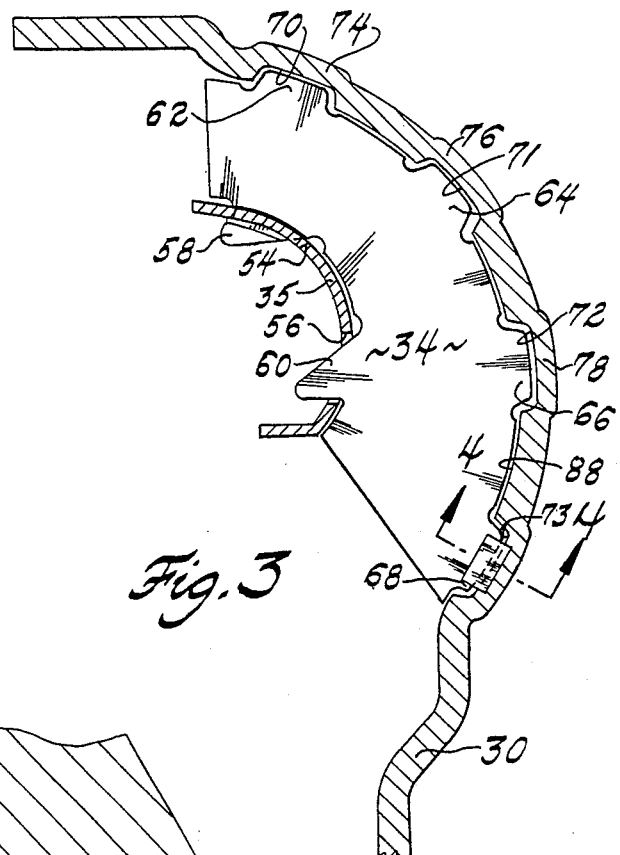
FIG. 3 is a cross section of zone 3 of FIG. 1 showing an impeller blade located on the impeller housing, but in larger scale and greater detail than FIG. 1 shows.

FIG. 3 shows in somewhat greater detail the impeller housing, impeller blades located on the housing, and shroud 35 located at the radially inner surface of the blade. Shroud 35 is substantially symmetric about axis 26 and serves to confine the hydraulic fluid contained in the impeller between the inner surface of the impeller housing and the outer surface of the shroud. The shroud has openings 54, 56 through its thickness, into which openings inner blade tabs 58, 60, protruding from the inner surface of the blades, extend. These tabs are bent by a roller supported on the inner surface of the shroud to connect mechanically the tabs to the shroud, as described in U.S. Pat. No. 3,316,622.

Each blade is also formed with outer tabs 62, 64, 66 and 68, which are fitted within recesses 70-73 formed in the impeller housing while the housing is press formed to its final shape. These recesses appear on the outer surface of the housing in the lower half of FIG. 1 as embossments 74, 76, 78 protruding from the otherwise smooth outer surface of the housing. The embossments are local and each extends along the length of the corresponding tab fitted in the recess.

Figure 2:
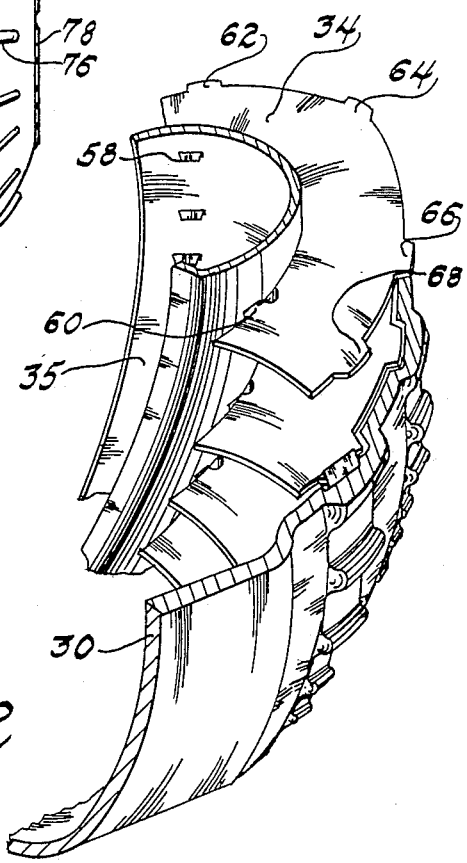
FIG. 2 is a perspective view taken in direction 2 of FIG. 1 showing the impeller housing, shroud and blades located between the shroud and housing.

FIG. 2 shows that each impeller blade is curved and extends along the toroidal path bounded by the housing and shroud. The blades are spaced uniformly and angularly about axis 26.

Figure 4:
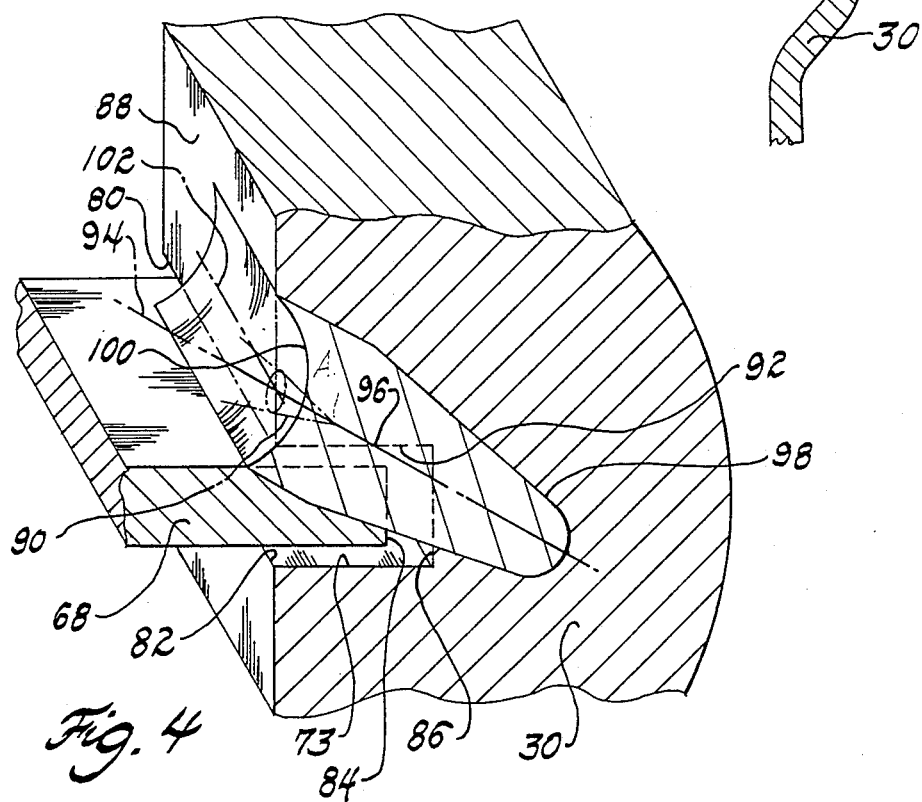
FIG. 4 is a cross section taken at plane 4—4 of FIG. 3.

FIG. 4 shows a radially inner blade tab 68 located within recess 73 on the impeller housing. Its position after being assembled on the impeller, but before welding, is drawn in solid and dashed lines. Recess 73 defines an edge 80 substantially parallel to the tab and extending along its length. A second edge 82 located at recess 73 on the opposite side of the tab from edge 80 is substantially parallel to the tab and extends along its length. The tab is spaced from edge 80 by a gap whose width is approximately 0.004 inches; edge 82 is spaced from the tab by approximately 0.008 inches; the lower surface 84 of the tab is spaced from base 86 of recess 73 by approximately 0.027 inches. These gaps are required to assure that the blade tab will fit within each recess of the housing.

A welding beam 90, preferably a laser beam, is directed by a welding gun toward surface 88, from a position located on the side of the tab 68 opposite the center of curvature of the blade. Alternately, the weld beam could be directed toward the impeller housing near edge 82 on the side that is closer to the center of curvature. When directed from this position there is somewhat less access space because blade curvature brings the body of the blade toward the welding beam. When the beam is directed as shown in FIG. 4, blade curvature locates the body of the blade away from the welding beam and permits greater access to surface 88.

The axes 94 of welding beam 90 is inclined at an angle in the range 20°–40° with respect to the lateral surface 92 of the recess and the tab. When a laser beam is used, the beam strikes surface 88 such that the diameter of the inclined conical welding beam immediately above surface 88 is in the range 0.030–0.050 inches. The focal point, i.e., the apex A of welding beam 90 is located 0.125–0.875 inches below surface 88 but on the impeller housing. The axis of the welding beam strikes surface 88 approximately 0.035 inches from edge 80 or surface 92. By locating the welding beam in relation to the recess and tab as described above, so that the focal point is located within the thickness of the housing, the heat produced by beam 90 first melts the material of the housing in the vicinity of the intersection of beam axis 94 and surface 88. Next, the material below surface 88, and eventually the tab, in the zone adjacent the axis of the beam are melted. Flow of molten housing metal into recess 73 bridges the gap between surface 92 and tab 68 and produces a depression 100 on surface 88. The recess eventually fills with molten housing metal to the approximate contour of weld nugget 98, fuses with the molten tab material and forms the nugget.

The welding beam axis is moved along line 102 the length of the tab and parallel to edge 80 at a rate of approximately one inch per second. Then, the impeller housing is indexed by rotation about axis 26, whereby an adjacent impeller blade is brought to the position of the blade of FIG. 4. Power is then supplied to the welding gun and the beam is moved along line 102 at the same rate of speed. This process continues until the radially inner end tab of each impeller blade is welded to the impeller housing. The magnitude of the electrical power supply to the welding gun and the rate at which the beam is moved with respect to the tab affects, in addition to the variables previously discussed, the form of the weld nugget and the extent of its penetration across the thickness of the tab and into the impeller housing below surface 86.

The impeller is formed and assembled by first embossing the impeller housing at four locations for each of the 31 blades of the impeller, thereby forming the recesses 70–73. Next, each of the four tabs for each blade are inserted into the corresponding recesses. These recesses are formed and dimensioned in relation to the tabs so that the curvature of the blade is maintained and the blade is located in relation to the housing as indicated in FIG. 2. Then, the radially inner tabs of each impeller blade are inserted into the hole 54, 56, of the shroud 35 and these inner tabs are rolled by a tool causing the tabs to bend across the thickness of the shroud and to engage the inner surface of the shroud. The impeller so assembled is then passed through a washer to decrease and clean the surfaces after which it is dried. The impeller is then retained in a fixture that establishes the angular relationship of the welding beam, the tab, and the housing as shown in FIG. 4. An inert cover gas is emitted by the welder and directed onto surface 88 in the vicinity of the intersection of the welding beam with that surface. The cover gas is argon, helium, nitrogen or $N_2O_2$ or a mixture of these. The laser beam welder is supplied from a source of electric power of approximately 3 kilowatts. A suitable laser beam welder for use in the method of this invention is Model No. 825 produced by Spectra-Physics, Inc., San Jose, Calif.

Having described a preferred embodiment of my invention, what we claim and desire to secure by U.S. Letters Patents is:

1. A method for making a torque converter comprising the steps of:

forming a blade having a first tab extending outward from the body of the blade and along a portion of the length of the blade;

forming a recess in the housing sized to receive the first tab therein, defining an edge adjacent the tab and extending along the tab;

inserting the first tab within the recess;

directing a welding beam at a first surface of the housing near the recess so that the beam strikes said surface a short distance from said edge and the focal point of the beam is located on the housing below said surface; and welding the housing and tab with the welding beam.

2. The method of claim 1 further comprising moving the welding beam along the length of the welded tab while welding the housing and tab.

3. The method of claim 1 wherein the welding beam is produced by a welder supplied with electric power in the range 2.5–3.5 kilowatts.

4. The method of claim 1 wherein the angle between the axis of the welding beam and the walls of the recess is in the range 25–35 degrees.

5. The method of claim 1 wherein the weld is made without filler material.

6. The method of claim 2 wherein the welding beam is moved along the length of the tab at a rate of approximately one inch per second.

7. A method for making a bladed torque converter having a housing carrying multiple blades comprising the steps of:

forming a blade having multiple tabs extending outward from the body of the blade and spaced from adacent tabs around the periphery of the blade, each blade having a first tab extending along a portion of the length of the blade;

forming recesses in the housing aligned in rows, each row spaced from adjacent rows about the longitudinal axis of the torque converter, each recess of a row being located and sized to receive the corresponding blade tab therein, at least one recess of each row defining an edge adjacent the corresponding tab and extending along the tab;

inserting the tabs within the corresponding recesses;

directing a welding beam at a first surface of the housing near the recess so that the beam strikes said surface a short distance from said edge and the focal point of the beam is located on the housing below said surface; and moving the welding beam along the length of the tab while welding the housing and tab.

8. The method of claim 7 further comprising:

moving the torque converter relative to the welding beam so that a second tab in another row is located with respect to the axis of the welding beam in position to be welded; and moving the welding beam along the length of the second tab while welding the housing and the second tab.

9. A method for welding a first member having a surface, a recess formed in the surface and an edge located at the recess, and second member located within the recess and spaced from the first member by a gap before welding, comprising the steps of:

directing a welding beam at the surface of the first member near the recess so that the beam strikes said surface a short distance from said edge;

inclining the welding beam toward the second member;

locating the focal point of the welding beam on the first member below said surface; and heating and melting the first member with the welding beam;

allowing molten metal from the first member to flow into the recess and to fill at least a portion of the gap below the surface; and fusing molten metal of the first and second members.

10. The method of claim 9 wherein locating the focal point of the welding beam includes locating said focal point a sufficient distance below the surface so that molten metal of the first member flows into the recess and prevents the welding beam from entering the gap until the gap is bridged at the welding beam by said molten metal.

11. The method of claim 9 wherein inclining the welding beam toward the second member includes inclining the axis of the welding beam relative to a wall of the recess at an angle having a magnitude in the range 25–35 degrees.

12. The method of claim 9 wherein inclining the welding beam toward the second member includes producing an angle between the axis of the welding beam and the second member having a magnitude in the range 25–35 degrees.

13. The method of claim 9 further comprising moving the the welding beam with respect to the first and second members while maintaining the position of the welding beam relative to the edge and its inclination.

* * * * *